July 24, 1951 J. R. BUCHANAN 2,561,611
MEANS FOR ARTICLE HOLDERS AND MOUNTING MEANS THEREFOR
Filed Aug. 6, 1947
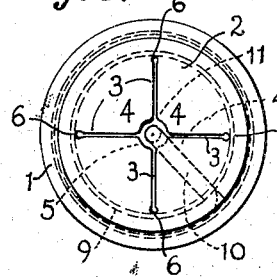
Fig. 1.
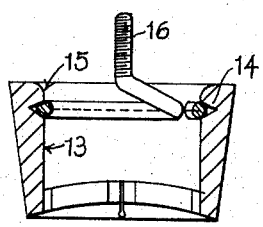
Fig. 3.
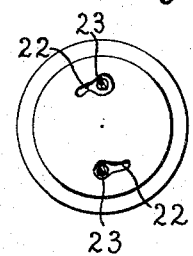
Fig. 6.
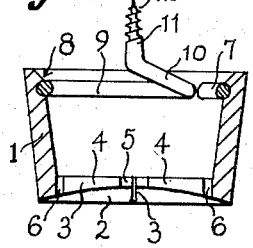
Fig. 2.
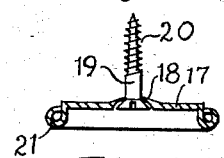
Fig. 4.
Fig. 5.
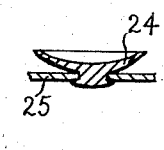
Fig. 7.
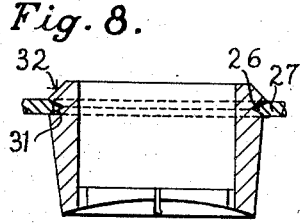
Fig. 8.
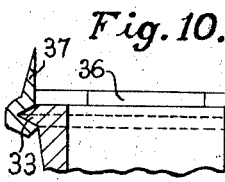
Fig. 10.
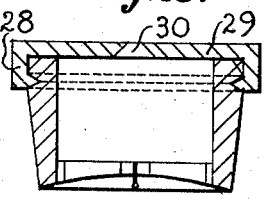
Fig. 13.
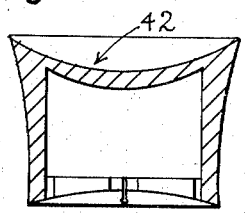
Fig. 9.
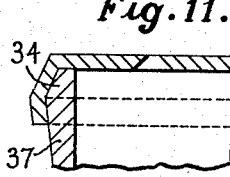
Fig. 11.
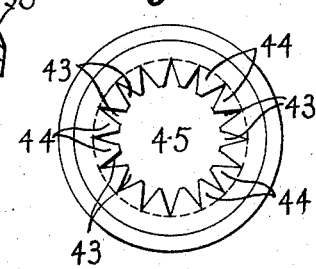
Fig. 14.
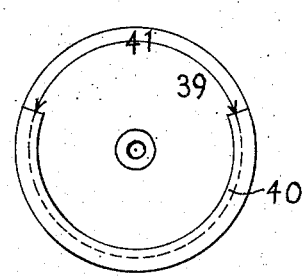
Fig. 12.
Inventor.
James Robert Buchanan.
per Ferdinand Broster Bosshardt
Attorney.

Patented July 24, 1951

2,561,611

UNITED STATES PATENT OFFICE 2,561,611

MEANS FOR ARTICLE HOLDERS AND MOUNTING MEANS THEREFOR

James Robert Buchanan, Manchester, England

Application August 6, 1947, Serial No. 766,758
In Great Britain August 30, 1946

3 Claims. (Cl. 248—314)

This invention relates to that kind of article holder which has a hollow body and tongues of resilient material, such as rubber.

An article holder of the hereinbefore specified kind is adapted to be removably mounted in or on a mounting means by means which enable it to be pushed into and pulled out of engagement with the mounting means from the front thereof.

The article holder may be adapted to be sprung into and out of engagement with the mounting means.

The said mounting means may be a portion of a piece of furniture or a board, plate or the like or an individual mount adapted to be attached to any suitable or convenient surface.

In one form of article holder the hollow body has an internal groove or channel adapted to be engaged with and disengaged from an internal mount by expansion of the hollow body.

In another form of article holder, the hollow body has an external groove or channel adapted to be engaged with an external mount, or the rim of a hole in a piece of furniture, board, plate or the like, by compression of the hollow body.

In another form of article holder, the hollow body has an external flange or enlarged part adapted to be engaged with an internal groove or channel or lugs of a mount by compression of the hollow body.

In all of the hereinbefore stated forms of article holder, a surface may be provided thereon to serve as a lead-in surface which acts to expand or compress the hollow body when the said body is pushed on to or into the mount and thereby facilitates engagement of the groove or channel or flange or enlargement of the hollow body with the mount.

In still another form of article holder, the hollow body may be provided with a sucker surface whereby it can be attached to any suitable surface by the well known sucker action.

The mount may be provided with a screw, screws or nail holes or a sucker surface whereby it can be attached to a suitable surface.

The mount may be provided with a surface to serve as a lead-in surface which acts to expand or compress the hollow body when the said body is pushed on to or into the mount.

I have illustrated various constructional examples of my invention in the accompanying drawings, wherein—

Figure 1 is a front elevation of an article holder with mount and illustrates one construction.

Figure 2 is a plan view in medial section thereof.

Figure 3 is a plan view in medial section of an article holder with mount and illustrates a second construction.

Figure 4 is a plan view in medial section of a mount and illustrates another construction thereof.

Figure 5 is a plan view in medial section of a mount and illustrates still another construction thereof.

Figure 6 is a front elevation of a mount and illustrates a further construction thereof.

Figure 7 is a fragmentary plan view in medial section of a mount and illustrates still a further construction thereof.

Figure 8 is a plan view in medial section of a holder with mount and illustrates a third construction.

Figure 9 is a plan view in medial section of a holder and illustrates a fourth construction.

Figure 10 is a fragmentary plan view in medial section of a holder with mount and illustrates a fifth construction.

Figure 11 is a fragmentary plan view in medial section of a holder with mount and illustrates a sixth construction.

Figure 12 is a front elevation of a mount and illustrates still another construction thereof.

Figure 13 is a plan view of a holder and illustrates a seventh construction.

Figure 14 is a plan view of a holder and illustrates an eighth construction.

Referring to the drawings, in the construction shown in Figures 1 and 2, I provide an article holder composed of rubber or rubber composition and comprising a tubular portion 1 which has an open end at the rear and an integral front end portion 2 having three, four or more slits 3 which divide the said end portion 2 into tongues 4 the tips of which are at or near the centre and the roots of which are at or near the periphery. The tips are preferably of concave form so that there is a central circular or other hole 5 where the tips terminate. Alternatively, the tips may be pointed so as nearly to meet. The outer ends of the slits 3 may terminate in circular holes 6 to reduce the likelihood of the outer ends of the slits 3 being extended by tearing of the rubber when the holder is in use. The end portion 2 is preferably concave at the front and flat at the rear.

The tubular portion 1 preferably tapers externally from the rear to the front end. Its inner surface may also taper in the same direction as shown in Figure 2 or be cylindrical. Near the rear end of the inner surface there is an annular groove or channel 7 of any suitable cross-section, for example segmental circular or V-shape. The rear extremity of the said surface is relieved or rounded to form a gradually increasing orifice in the interior of the tubular portion 1, for example a hollow conical orifice 8.

A mount is provided for the holder and is adapted to engage the annular groove or channel 7 tightly. The said mount may consist of a piece of wire bent so as to have a ring-like portion 9 to fit tightly in the annular groove or channel 7, a portion 10 which extends radially inwards and slantingly rearwards and then a portion 11 which extends directly rearwards, the portion 11 being concentric with the ring-like part and having a wood screw-thread 12 or metal screw-thread whereby the portion 11 can be screwed into any suitable support composed of wood or metal or other material.

The holder is forced in a rearward direction on to the mount until it has expanded sufficiently to enable it to slip on to the mount sufficiently far to enable the groove or channel 7 to engage the ring-like portion 9 of the mount, whereupon the resiliency of the holder causes it to contract on to the portion 9 and grip the same. The expansion of the holder is assisted by the form of the orifice 8 which cooperates with the ring-like portion 9 to produce an expansion of the holder when the holder is pushed on to the mount.

The portion 11 of the mount projects rearwardly beyond the holder and is therefore free to be screwed into a support by rotation of the holder. When the mount has been attached to the support, the holder can be quickly sprung off it by pulling and sprung on to it by pushing from the front whenever desired, without disturbance of the mount or the removal or replacement of screws or other fastening means.

Figure 3 shows a cylindrical inner surface 13 of the tubular portion of the holder, an annular groove or channel 14 of V-shaped cross-section in the said portion, a rounded lead-in orifice 15 of the said portion, and a metal screw thread 16 on the mount.

In the alternative construction of mount shown in Figure 4, for mounting the holder, there is a disc 17 having a dished centre portion 18 and a central hole therein for a headed screw 19 with wood or metal screw-thread 20 to project through rearwardly, the head of the screw 19 being accommodated in the dished portion 18 and the screw being affixed to the disc 17 by solder or other suitable means. Alternatively, as there may be merely a central hole in the disc 17 or, as shown in Figure 5, a plurality of suitably distributed holes 20 in the disc, either countersunk or not, for attachment of the disc to a support by a loose screw or nail or loose screws or nails. The periphery of the disc is bent forwards and outwards, the outwardly bent part forming a continuous or interrupted radial flange 21 adapted to engage tightly the annular groove or channel 7 or 14 in the inner surface of the tubular portion of the holder.

Instead of screw-fastening means, any other means may be provided for attachment of the disc to a support. For example the disc may have bayonet-slots 22, Figure 6, for engagement with headed screws or pins 23 provided on the support, or, as shown in Figure 7, the disc may be provided with a rubber or leather sucker 24. In this figure the disc is indicated by the reference numeral 25.

In another construction of article holder, it is as hereinbefore described, except that, instead of a groove or channel in the inner surface, it has a groove or channel 26, Figure 8, in the outer surface of the tubular part. The groove or channel 26 may be adapted to engage the rim of a hole 31 provided in a support 27, or as shown in Figure 13, an inwardly directed radial continuous or interrupted flange 28 provided on a mounting disc 29 having a screw such as that shown in Figure 4, or a screw hole 30 screw holes or other suitable means for attaching it to a support. The holder is sprung into and out of engagement with the hole 31 or flange 28 in a manner similar to that hereinbefore described, the tight engagement of the groove or channel 26 with the rim of the hole 31 or the flange 28 producing the desired connection. The rear end of the outer surface may be relieved, as at 32, to facilitate the compression of the holder which takes place whilst it is being pushed into the hole 31 or flange 28 sufficiently far to effect registration of the groove or channel 26 with the rim of the hole 31 or the flange 28.

In the construction of article holder shown in Figure 10, the outer surface of the tubular part is provided with a flange 33 of relatively small diameter. In the construction shown in Figure 11, the said outer surface has a conical rear end 34, the flange 33 being adapted to be axially sprung into a continuous or interrupted annular cavity, groove or channel 35 of a disc- or ring-like mount 36 having means, such as spikes 37, whereby it can be affixed to a support. The holder illustrated in Figure 11, by virtue of its conical external surface 37 and its conical end 34 can be pushed into and out of a mount such as the mount 38.

In a modification, where the holder has an external groove or channel or flange or conical part, the engaging part of the mount may be of ring-segmental form, for example as shown in Figure 12 wherein 39 is the mount having a ring-segmental engaging part 40, and the holder be sprung thereinto laterally through the peripheral gap 41 provided in the engaging part 40.

In the construction of article holder shown in Figure 9, the rear end of the holder is provided with a concave surface 42 so that the rear end acts as a sucker whereby it can be attached by suction to a suitable supporting surface.

The number, size and shape of the slits and tongues, and the size and shape of the central hole, if any, formed by the tips of the tongues may vary according to the purpose of the article holder. For example, in a holder for articles such as pieces of towels, washing and other pieces of fabric, kitchen implements, tools, writing implements and so forth there may be four slits, as shown in Figures 1 and 2, and therefore four tongues and the central hole may be circular and relatively small and the slits very narrow, whereas for other articles, such as tumblers and so forth, there may be, for example as shown in Figure 14, a considerably larger number of slits 43 and therefore tongues 44 and the central hole 45 may be comparatively large. This holder faces upwards so that the tumbler or the like can be inserted and removed from above. The articles are inserted in known manner in the holder by pushing a suitable part thereof rearwardly against the slitted end of the holder and thereby causing the tongues to bend rearwardly and outwardly, their resiliency causing them to grip the said part sufficiently strongly to hold the said part securely but not so forcibly as to prevent the part from being pulled out when desired.

I claim:

1. An article holder comprising a tubular peripherally unbroken body composed of non-metallic resilient elastic material, integral tongues at the front end of the body for gripping articles between them, an open end at the rear end of the body for enabling the said rear end to expand and contract resiliently, an annular groove formed in the thickness of the peripheral wall of the body at the rear portion of the said body and decreasing progressively in width from its mouth and a mounting means which releasably engages the groove and creates frictional resistance against rotation of the body relative to the mounting, in combination with a screw rigidly and centrally fixed to the said mounting means for screwing into a supporting surface by rotation of the said body by hand, connecting means being provided on the mounting means for releasable engagement with the groove and increasing progressively in width, whereby the said body is adapted to be engaged with the mounting means merely by being pushed into engagement therewith, and disengaged merely by being pulled out of engagement therewith.

2. An article holder comprising a tubular, peripherally unbroken body composed of non-metallic resilient elastic material, integral tongues at the front end of the body for gripping articles between them, an open end at the rear end of the body for enabling the said rear end to expand and contract resiliently, an annular groove formed in the thickness of the peripheral wall of the body at the rear portion of the said body and decreasing progressively in width from its mouth and a mounting means which releasably engages the groove and creates frictional resistance against rotation of the body relative to the mounting, in combination with a screw rigidly and centrally fixed to the said mounting means for screwing into a supporting surface by rotation of the said body by hand, connecting means being provided on the mounting means for releasable engagement with the groove and increasing progressively in width, whereby the said body is adapted to be engaged with the mounting means merely by being pushed thereon, and disengaged merely by being pulled thereaway.

3. An article holder comprising a tubular, peripherally unbroken body composed of non-metallic resilient elastic material, integral tongues at the front end of the body for gripping articles between them, an open end at the rear end of the body for enabling the said rear end to stretch and shrink resiliently, in combination with an internal annular groove of V-cross section reducing the thickness of the peripheral wall of the body at the rear portion of the said body, a mounting means, connecting means on the mounting means for engagement with and disengagement from the V-groove merely by a straight push of the body on to or straight pull of the body off the mounting means and for creating a frictional grip between the mounting means and the body, and a central screw integral with the said mounting means for screwing into a supporting surface by gripping and rotating the said body and thereby rotating the said mounting means.

JAMES ROBERT BUCHANAN.

REFERENCES CITED

The following references are of record in the file of this patent:

UNITED STATES PATENTS

| Number | Name | Date |
|---|---|---|
| 1,086,200 | Michie | Feb. 3, 1914 |
| 2,051,068 | Ayre et al. | Aug. 18, 1936 |
| 2,243,322 | Van Uum | Mar. 27, 1941 |
| 2,236,496 | Biggs | Apr. 1, 1941 |
| 2,278,075 | Hecht | Mar. 31, 1942 |
| 2,339,187 | Pain | Jan. 11, 1944 |

FOREIGN PATENTS

| Number | Country | Date |
|---|---|---|
| 440,769 | Great Britain | Jan. 6, 1936 |